United States Patent Office 2,718,476
Patented Sept. 20, 1955

2,718,476

DRAWING MATERIAL

Adrian Eichorn, Topanga, Calif., assignor to Screen Engineering Co., Santa Monica, Calif., a corporation of California No Drawing. Application February 18, 1953,
Serial No. 337,673

12 Claims. (Cl. 117—76)

This application is a continuation in part of my co-pending application Serial No. 787,855, filed November 24, 1947, now abandoned.

It has long been a vexing problem, particularly in aircraft construction, to find some way to counteract or neutralize the dimensional instability of conventional drawing surfaces such as paper, tracing cloth, and the like, employed in making full scale drawings for prototypes or patterns, since such materials are hygroscopic and expand or contract with changes of atmospheric moisture (as well as with temperature changes), thus throwing off the minute tolerances and exact dimensions necessary for precision machining.

Due to this particular difficulty, countless hours have been expended in slowly scribing production drawings on metal templates, such as sheet aluminum. In the alternative, many attempts have been made, either to draw on some other more stable material, or to directly attach a less stable sheet of paper, or the like, to the metal template. Thus, drawings have been made on metalfoil, or paper drawings made to scale have been attached to metal or other backing by use of various plastic or adhesive compositions. Numerous attempts have also been made to transfer such drawings to templates by means of photo-sensitive materials, but these have generally relied on a reflex transfer of the drawing to the metal from the hygroscopic drawing sheet attached by one means or another to a more stable support.

By the present invention, however, there is provided a light-transmitting, flexible sheet, dimensionally stable against both heat and humidity changes, upon which sheet, original, full-scale production drawings can be directly made and which sheet can be employed by the present process to produce any number of clear and precise, either right or left-hand prints directly upon a template, metal workpiece or other material.

The present process is based upon the combination or association of a light-transmitting, dimensionally stable sheet of backing material, with a coating substance, also transparent or translucent, which coating, after application to the material, is adapted to receive pencil or other drawing marks and retain the same for subsequent printing. The sheet material found particularly applicable for the present purpose is glass cloth or woven glass fabric, such as the commercial one-ply, grades 108, 112, 119, 124, or 128. If light is to pass between the side of the glass cloth bearing a drawing and the surface being printed upon, a maximum thickness of about .008 inch is indicated for the cloth, while on the other hand, if the side drawn on is placed immediately adjacent the surface being printed upon, a much greater thickness of glass cloth may be employed, as long as it will transmit light.

The glass cloth is made up of a woven glass fabric impregnated with a "stiffening" substance of polyester or allyl resin in order to impart the desired rigidity to the fabric. Such resin, effectively contributes to the physical properties of the fabric. By filling the interstices between the glass fibers, it overcomes the tendency of the individual fibers to scatter or diffuse light without reducing the light transmission. It also contributes to the thermal and hygroscopic stability of the finished sheet. The polyester resins suitable for this purpose are the polymerization product of a mixture of a compound having a single terminal ethylenic group $CH_2=C<$ with an unsaturated alkyd resin which is the reaction product of an ethylenic-alpha-beta dicarboxylic acid with a glycol. These ingredients are reacted in such proportions that there are present in the reacting mixture about one carboxyl group in such unsaturated acid to one hydroxyl group in such glycol to an advanced stage of esterification, but short of becoming completely insoluble and infusible, until a product of low acid number is produced which is soluble in a liquid monomeric unsaturated polymerizable compound containing an ethylenic linkage. This product of esterification is mixed with a liquid monomeric unsaturated polymerizable compound containing an ethylenic linkage. The glass fabric is impregnated with this solution and the solution is subjected to conjoint polymerization in the absence of air to form an insoluble, infusible resin filling the interstices of the glass fabric.

Probably the best commercial example of these resins is the resin formed from a mixture of styrene with diethylene glycol maleate. However, compounds other than styrene which have a single terminal ethylenic group may be used; e. g. alpha substituted ethylene compounds of the general formula $CH_2=CR_1R_2$ where $R_1$ is a negative group such as aryl, vinyl, ethynyl, carboxyl, halogeno, O—CO-alkyl (acyloxy), CO.O. alkyl (carbalkoxy), alkoxy, aldehyde, nitrilo or halovinyl, and $R_2$ is hydrogen or an alkyl group.

These compounds are in contrast with the unsaturated polybasic acids used to form the polyester resins which acids may be defined as ethylene alpha-beta dicarboxylic acids. In addition to maleic acid or anhydride, fumaric acid, itaconic acid and citraconic acids and anhydrides may be used. The dihydric alcohol or glycol may be diethylene glycol, ethylene glycol, triethylene glycol, trimethylene glycol, monoethylin, or propylene glycol and its derivatives. The dicarboxylic acids and dihydric alcohols form chain compounds which may be termed "linear polyesters." In the final cure the linear molecule is converted by the substituted-ethylene body with which it is mixed to a molecule of the 3-dimensional type (insoluble and infusible) by some form of cross-linkage between the linear molecules. The cross-linkage causing cure is believed to be a copolymerization between the unsaturated alkyd resin and the monomeric resin forming body.

Plasticizers may be added to the stiffening resin to make the dimensionally stable sheet more flexible and less brittle. For example, the phthalate of diethylene glycol monoethyl ether, sucrose octacetate, camphor, diethylene glycol phthalate, glycol succinate, diethylene glycol oxalate and glycol benzoate-phthalate.

The stiffening resin filler is generally incorporated in the glass cloth by passing a strip of the latter through a tank of the designated resin, then drawing it between squeezing rollers and heating the fabric on the order of 15–20 minutes at about 200° F.

By the present process, the resin-impregnated sheet is coated with an adhesive layer of organic plastic material particularly adapted to provide a surface which may be marked or inscribed by any conventional drafting instrument, including even such a hard drafting pencil as 9H. A wide variety of coating materials may be used for this purpose. One type of coating material is based on an intimate mixture of three resinous or plastic ingredients. These are (1) an air-drying, film-forming plastic, such as nitrated cellulose of the type commonly used in lacquer, (2) a plasticizing and adhesive substance, such as alkyd resin which solidifies or polymerizes upon subsequent baking of the coated sheet, and (3) melamine (aldehyde resin) which is polymerized in situ to contribute hardness to the solidified coating.

The lacquer grade of cellulose nitrate which is conveniently employed contains about 11% nitrogen. However, this amount is not critical for the present purpose and other grades of nitrated cellulose having greater or lesser amount of nitrogen may likewise be used. If desired, amounts of other plasticizer may also be present, such as high-boiling esters as cresyl or phenyl phosphates and phthalates; likewise chlorinated hydrocarbons, castor oil and/or camphor; against polyester resins may be used for this purpose and it is conceivable that the presence of the impregnated polyester resin in the glass fibre sheet promotes the adhesion thereto of the coat of cellulose nitrate plasticized with polyester resin. Polyester resins having air-drying properties may also promote the solidification or hardening of the film. Amounts of plasticizer on the order of about 1% to 5% by weight, are applicable although, again, this range is not critical. It is better to avoid use of volatile plasticizers, as they might slightly effect the stability of the sheet over a period of time.

Alkyd resins, as is well known, are the esterification products of polyacids such as phthalate, maleic, succinic, etc., with polyhydroxy alcohols, and in particular, the reaction product of glycol or glycerol with phthalic anhydride. Desirably, the commercial, oil-modified alkyd resin, such as is employed in varnishes and lacquers, is used. It contains added amounts of air-drying ingredients, such as drying oil (e. g. triglycerides of unsaturated mono acids such as linoleic). However, non-air-drying alkyd resin is also applicable.

It will be realized, of course, that alkyd resin, as well as the melamine resin, are not generally air-drying, but are polymerized by heat. Accordingly, it is seen that in the present combination, the nitrated cellulose acts as a spreading agent for the other ingredients, promoting adhesion of the mixture to the glass cloth and forming an air-drying film of the same after spreading, while the other resinous components are later hardened or polymerized, chiefly by subsequent heating, although over a period of time they would tend to harden by exposure to air without heat.

In the resinous component, I may use, for example, 45 parts cellulose nitrate, 45 parts melamine, and 10 parts alkyd resin (by weight), although such proportions can be varied widely, a workable range being approximately:

*Example I*

| | |
|---|---|
| Cellulose nitrate | 30–50 |
| Melamine | 30–50 |
| Oil modified alkyd resin | 5–20 |

In this embodiment, the melamine aldehyde resin contributes a necessary hardness to the solidified coating and in contrast to the oil-modified alkyd resin which may harden in time in the presence of oxygen, melamine resin generally requires a catalyst and/or baking to solidify. Accordingly, the alkyd resin may be regarded in this respect in part as a binder for the nitrocellulose and melamine.

In addition to the mixed resinous component of the coating composition, there is desirably present a slightly abrasive material which will give a "tooth" to the coating so as to receive the graphite markings from the drawing pencil. For the "tooth" material I prefer siliceous materials such as a mixture of talc with colloidal silica or diatomaceous earth. Thus, I may use, for example, 100 parts silica, with 100 parts of the foregoing resinous mixture. These proportions are not, however, critical. For use with a lighter drawing pencil, the tooth material could be reduced, say, by half.

With approximately 40 parts (by volume) of the foregoing intimate mixture of resin and abrasive agent there is also incorporated an amount (e. g., 40 to 80 parts) of solvent or dispersing agent capable of providing a fluid mass and of preventing the separation of the several ingredients upon standing. Desirably, such an inert liquid vehicle possesses a low vapor pressure so as to minimize loss by evaporation, and for this purpose I prefer an organic compound containing both a hydroxy radical and an ether linkage such as the lower alkyl ethers of ethylene glycol, propylene glycol, diethylene glycol, etc. Particular mention may be made of the di- or polyhydroxy compounds, such as the lower monoalkyl ethers of diethylene glycol. Such glycol ethers generally contain from one to four or six (or more) carbon atoms in each, usually alkyl, carbon chain within the molecule, e. g., methyl, ethyl, butyl, phenyl, etc. Other applicable solvents which may be used in whole or part include: esters such as methyl-, ethyl-, amyl-, butylacetates, lactates, etc.; the corresponding alcohols and ketones, diacetone alcohol, etc.

Such a composition may be stored indefinitely. Before the coating is applied, it is first diluted with a thinner, of which a typical formula is:

90 parts of the solvent used above, e. g., mono butyl ether of diethylene glycol.

10 part aromatic hydrocarbon mixture, such as commercial toluol.

2 parts adhesive ingredient, such as styrene.

$\frac{1}{10}$ part polymerization catalyst for melamine, such as phosphoric acid.

The amount of thinner employed varies with the particular method by which the coating is to be applied to the glass cloth. For coating with silk screen process, for example, about $\frac{1}{3}$ volume of thinner is used. If the composition is to be applied by brushing or roller coating, a less viscous solution is desired. After application, the coated sheet is heated, on the order of 30 minutes at 240° F., to solidify the coating.

A wide variety of other coatings may be applied to the filled glass fabric base sheet in order to provide an adherent overcoat of a film forming organic material containing an abrasive agent to impart pencil "take" to the dimensionally stable drawing material. For example, transparent coatings containing one or more of the following resins in combination with suitable plasticizers and an abrasive agent may be used; e. g. nitrocellulose, other cellulose esters such as, cellulose acetate, alkyd resins, vinyl resin, various vinyl copolymers, urea formaldehyde and melamine formaldehyde. The following specific examples illustrate coating compositions which may be applied by kiss coating from a roller. By varying the solvent proportions, suitable compositions for spraying or screen application may be obtained. In the following formulae all resin proportions are on a solid weight basis.

AIR DRY TYPES

*Example II*

(NITROCELLULOSE)

| | Parts |
|---|---|
| Nitrocellulose RS (60–80 second) | 100 |
| Modified rosin, such as Teglac Z-152 (American Cyanamide) | 50 |
| Di octyl phthalate plasticizer | 20 |
| Diatomaceous earth | 60 |
| Toluol | 450 |
| Ethanol | 80 |
| Ethyl acetate | 425 |
| Butyl acetate | 50 |

Example III (NITROCELLULOSE-ALKYD)

| | Parts |
|---|---|
| Nitrocellulose RS (60–80 second) | 100 |
| High phthalic oxidizing alkyl, such as Rezyl 387–5 (American Cyanamide) | 220 |
| Diatomaceous earth | 110 |
| Toluol | 550 |
| Ethanol | 75 |
| Butanol | 75 |
| Ethyl acetate | 350 |
| Butyl acetate | 90 |

Example IV (VINYL)

| | Parts |
|---|---|
| Vinyl chloride-acetate copolymer, such as Vinylite VAGH (Carbide & Carbon) | 10 |
| Diatomaceous earth | 35 |
| Toluol | 25 |
| Methyl ethyl ketone | 65 |
| Methyl isobutyl ketone | 35 |
| Isophorone | 5 |

As previously noted, glass cloth coated with the foregoing, translucent, resin mixtures containing an abrasive agent can be drawn upon with pencil or ink and the opaque pencil lines pattern the light transmitted through the sheet onto any light-sensitive material. The drawing could similarly be made with ink. In the alternative, a highly pigmented coating including a white pigment such as titanium dioxide or a dark pigment (such as practically any color, paint pigment as chromium hydrate or toluidine red) may be employed to produce an opaque coating which may be scratched by a dry pen or metal scribe so that in making prints from such a drawing light passes only through the scribed lines. In addition to titanium dioxide other white pigments such as zinc or lead oxide or sulphide may be substituted in whole or in part.

Since the present drawings are both light-transmitting and dimensionally stable, they may be used to transfer or reproduce the drawings directly onto a template, prototype or other surface. Such a surface may then be drilled, cut or otherwise shaped. Thus it may form the actual wing of an airplane, for example, being cut and drilled along the transferred drawing lines.

For this purpose, there are also provided fluid compositions containing light-sensitive ingredients which may be applied to metal surfaces and caused thereupon to solidify. After exposure to light transmitted through one of the above drawings, the metal coating can then be readily "developed" simply by flooding with water or by other appropriate means.

Conventional blueprint salts (e. g., ferric ammonium citrate and potassium ferricyanide) may be thus applied in a carrier such as aqueous, hydrolyzed cellulose (e. g. hydroxy ethyl cellulose, sodium carboxymethylcellulose, etc.) containing a tanning or hardening agent such as a lower molecular weight aldehyde (formaldehyde, glyoxal paraldehyde, etc.) which renders the carrier hard or water-insoluble after application to the metal. An aldehyde concentration of about 15% to 35% of the hydrolyzed cellulose is generally applicable. Such hardening action is apparently promoted by a mildly acid solution on the order of about pH 6.5 to about pH 4.5, although the solution need not be acidic. The function of the carrier is, of course, to evenly distribute and fasten the light-sensitive salts to the metal surface. The action of the aldehyde on the hydrolyzed cellulose is only apparent after the aqueous film of the latter has lost most of its water content; in other words, as long as the cellulose is kept wet it does not harden.

Other coagulable carbohydrate or proteinaceous substances may be substituted in whole or part for the hydrated cellulose, including gum acacia, gum tragacanth, starch gums, dextrin, gelatin, albumins, histones, etc. They may be hardened by application of heat and/or hardening agents, such as ammonium sulfate, chromium aluminum sulfate, soluble bichromates, etc.

The amount of hydrolyzed cellulose or other coagulable ingredient used will depend upon the viscosity permitted by the particular method of application. For silk screen process, a viscosity of about 250 to 1000 centipoises is applicable; for brush and roller coating, about 100 to 250 centipoises; for spraying, about 35 to 75 centipoises.

There may also be present about 0.5% to 10% of a surface active or wetting agent, such as those listed in Industrial and Engineering Chemistry, vol. 35, pages 126–130 (January 1943); also about 5% to 20% of a flow agent, such as the hydroxy ethers listed earlier; and particularly for silk screen application, there may be included about 0.1% to 0.5% of a defoaming agent, such as cyclohexanol, octyl alcohol, etc.

Several suitable formulas are as follows:

I

| | Parts by weight |
|---|---|
| Hydroxy ethylcellulose | 12 |
| Glyoxal (dialdehyde) | 4 |
| Flow agent | 50 |
| Ethylene glycol monobutyl ether, 49 | |
| Ethyl lactate, 49 | |
| Octyl alcohol, 2 | |
| Distilled water | 500 |
| Ferric ammonium citrate (green scales) | 50 |
| Citric acid | 30 |
| Potassium ferricyanide | 11 |

II

| | Parts by weight |
|---|---|
| Hydroxy ethylcellulose | 12 |
| Formaldehyde | 2 |
| Flow agent | 50 |
| Ethylene glycol monobutyl ether, 49 | |
| Ethyl lactate, 49 | |
| Trimethyl cyclohexanol, 2 | |
| Distilled water | 500 |
| Ferric ammonium citrate (green scales) | 50 |
| Citric acid | 30 |
| Potassium ferricyanide | 11 |

III

| | Parts by weight |
|---|---|
| Hydroxyethylcellulose | 12 |
| Glyoxal (dialdehyde) | 4 |
| Flow agent (either of above) | 20 |
| Distilled water | 200 |
| Ferric ammonium citrate (green scales) | 15 |
| Ferric ammonium oxalate | 15 |
| Ferric oxalate | 2 |
| Potassium ferricyanide | 5 |

IV

| | Parts by weight |
|---|---|
| Sodium carboxymethylcellulose | 6 |
| Dialdehyde | 2 |
| Flow agent (either of above) | 20 |
| Distilled water | 200 |
| Ferric ammonium citrate (green scales) | 6 |
| Ferric ammonium oxalate | 18 |
| Ferric chloride | 2 |
| Potassium citrate | 2 |
| Potassium ferricyanide | 4 |

Variations of the blueprint salts to 10% have little effect on quality or speed of print. Increase of potassium ferricyanide slows up the printing time. Decrease of ferric ammonium citrate decreases quality or brilliance of print. Decided decrease of citric acid tends to make a weaker, or softer film. Apparently the pH or acidity of the solution combined with the aldehyde determines the hardness or strength of the film. Increase of citric acid lowers the keeping quality of the solution.

Generally the metal is first covered with conventional white template paint in order to improve the contrast of the print and prevent the blueprint salts from coming into contact with the base metal which would slowly decompose the light-sensitive salts and reduce their effectiveness. However, it may be etched or anodized and the light-sensitive coating then applied direct. The hydrolyzed cellulose coating hardens in about one-half to two hours, and the drawing is then placed over it and exposed to light such as photo flood light, arc light, mercury vapor, sunlight, etc. Following exposure, the metal surface is swabbed with water containing about 2% potassium bichromate according to conventional blueprint procedure, and then washed with cold water. Upon drying, the drawing will be found to have been printed upon the metal with great clarity and precision. If the drawing has been made with pencil or ink upon the glass cloth containing a translucent coating, they will show on the metal as white lines on a blue background. If the original drawing was made with a scribe upon an opaque coating, the metal print will have blue lines on a white background. In either event, a right or left-hand print will be made (without a negative) depending upon whether the inscribed face or the reverse face of the drawing is placed next to the metal.

In place of the blueprint salts brownprint or Van Dyke salts may be used or diazo-type dye forming components (such as described in the British Patents Nos. 210,862 and 234,818 and in German Patents Nos. 376,385 and 386,433) and the print developed with aqueous ammonia vapor or by the semi-wet method. Bichromated gelatin coatings or gelatin coatings containing silver halides may also be applied to the metal for this purpose.

Or again, the present drawing may be used to produce a duplicate drawing upon a sheet of glass cloth coated with suitable light-sensitive salts. Such duplicate drawing can then, of course, be used to make line prints upon any suitable material. Two different formulae for coating the glass cloth to form a Van Dyke negative are:

V

| | Parts by weight |
|---|---|
| Hydroxy ethylcellulose | 12 |
| Dialdehyde | 4 |
| Flow agent (as above) | 20 |
| Ferric ammonium citrate (green scales) | 17.5 |
| Silver nitrate | 5 |
| Citric acid | 10 |
| Distilled water | 200 |

VI

| | Parts by weight |
|---|---|
| Sodium carboxymethylcellulose | 6 |
| Formaldehyde | 2 |
| Flow agent | 20 |
| Ferric ammonium oxalate | 20 |
| Silver nitrate | 7 |
| Distilled water | 200 |

Gelatin may also be used as a carrier in these as well as the earlier formulae. This would require heating of the solution before application.

The coated glass cloth sheet is contacted to the drawing or the other glass cloth sheet, in a printing frame, then exposed to light. The print is washed in water, then fixed in a 2% hypo bath, then again washed in water.

While I have described the present compositions and processes by reference to particular materials and exact proportions, it is to be understood that these are given by way of illustration rather than as necessary limitations of the invention which is to be broadly construed as hereafter defined, having in mind such modifications and substitution of equivalents as will occur to those skilled in the art.

Having thus described the invention what is claimed is:

1. A dimensionally stable light transmitting flexible sheet material for carrying a highly precise image which may be copied comprising a woven glass fabric filled with a polyester resin which is the polymerization product of a compound having a single terminal ethylenic group with the reaction product of an ethylenic-alpha-beta dicarboxylic acid and a glycol and an adherent overcoat of a transparent film forming organic resinous material on the surface of the filled fabric containing an amount of abrasive agent sufficient to make said layer receptive to pencil lines.

2. A dimensionally stable light transmitting flexible sheet material for carrying a highly precise image which may be copied comprising a woven glass fabric filled with a polyester resin which is the polymerization product of a compound having a single terminal ethylenic group with the reaction product of a dicarboxylic acid selected from the group consisting of maleic, fumaric, itaconic and citraconic acids and a dihydric alcohol selected from the group consisting of ethylene glycol, diethylene glycol, triethylene glycol, trimethylene glycol, monoethylin, propylene glycol and derivatives thereof and an adherent overcoat of a transparent film forming organic resinous material on the surface of the filled fabric containing an amount of abrasive agent sufficient to make said layer receptive to pencil lines.

3. A dimensionally stable light transmitting flexible sheet material for carrying a highly precise image which may be copied comprising a woven glass fabric filled with a polyester resin which is the polymerization product of styrene with diethylene glycol maleate and an adherent overcoat of transparent film forming organic resinous material on the surface of the filled fabric containing an amount of abrasive agent sufficient to make said layer receptive to pencil lines.

4. A dimensionally stable light transmitting flexible sheet material of not more than .008 of an inch thickness for carrying a highly precise image which may be copied comprising a woven glass fabric filled with a polyester resin which is the polymerization product of a compound having a single terminal ethylenic group with the reaction product of an ethylenic-alpha-beta dicarboxylic acid and a glycol and an adherent overcoat of a transparent film forming organic resinous material on the surface of the filled fabric containing an amount of abrasive agent sufficient to make said layer receptive to pencil lines.

5. A dimensionally stable light transmitting flexible sheet material for carrying a highly precise image which may be copied comprising a woven glass fabric filled with a polyester resin which is the polymerization product of a compound having a single terminal ethylenic group with the reaction product of an ethylenic-alpha-beta dicarboxylic acid and a glycol and an adherent overcoat of a transparent film forming organic resinous material on the surface of the filled fabric containing an amount of a siliceous abrasive agent sufficient to make said layer receptive to pencil lines.

6. A dimensionally stable light transmitting flexible sheet material for carrying a highly precise image which may be copied comprising a woven glass fabric filled with a polyester resin which is the polymerization product of a compound having a single terminal ethylenic group with the reaction product of an ethylenic-alpha-beta dicarboxylic acid and a glycol and an adherent overcoat of a transparent film forming organic resinous material comprising a cellulose ester resin on the surface of the filled fabric containing an amount of abrasive agent sufficient to make said layer receptive to pencil lines.

7. A dimensionally stable light transmitting flexible sheet material for carrying a highly precise image which may be copied comprising a woven glass fabric filled with a polyester resin which is the polymerization product of a compound having a single terminal ethylenic group with the reaction product of an ethylenic-alpha-beta dicarboxylic acid and a glycol and an adherent overcoat of a transparent film forming organic resinous material comprising an alkyd resin on the surface of the filled fabric containing an amount of abrasive agent sufficient to make said layer receptive to pencil lines.

8. A dimensionally stable light transmitting flexible sheet material for carrying a highly precise image which may be copied comprising a woven glass fabric filled with a polyester resin which is the polymerization product of a compound having a single terminal ethylenic group with the reaction product of an ethylenic-alpha-beta dicarboxylic acid and a glycol and an adherent overcoat of a transparent film forming organic resinous material comprising a melamine aldehyde resin on the surface of the filled fabric containing an amount of abrasive agent sufficient to make said layer receptive to pencil lines.

9. A dimensionally stable light transmitting flexible sheet material for carrying a highly precise image which may be copied comprising a woven glass fabric filled with a polyester resin which is the polymerization product of a compound having a single terminal ethylenic group with the reaction product of an ethylenic-alpha-beta dicarboxylic acid and a glycol and an adherent overcoat of a transparent film forming organic resinous material comprising a urea formaldehyde resin on the surface of the filled fabric containing an amount of abrasive agent sufficient to make said layer receptive to pencil lines.

10. A dimensionally stable light transmitting flexible sheet material for carrying a highly precise image which may be copied comprising a woven glass fabric filled with a polyester resin which is the polymerization product of a compound having a single terminal ethylenic group with the reaction product of an ethylenic-alpha-beta dicarboxylic acid and a glycol and an adherent overcoat of a transparent film forming organic resinous material comprising a vinyl resin on the surface of the filled fabric containing an amount of abrasive agent sufficient to make said layer receptive to pencil lines.

11. A dimensionally stable light transmitting flexible sheet material for carrying a highly precise image which may be copied comprising a woven glass fabric filled with a polyester resin which is the polymerization product of a compound having a single terminal ethylenic group with the reaction product of an ethylenic-alpha-beta dicarboxylic acid and a glycol and an adherent overcoat of a transparent film forming organic resinous material on the surface of the filled fabric containing an amount of pigment sufficient to make said layer substantially opaque to actinic light, said layer being capable of being removed with a scribing tool.

12. A dimensionally stable light transmitting flexible sheet material for carrying a highly precise image which may be copied comprising a woven glass fabric filled with a polyester resin which is the polymerization product of a compound having a single terminal ethylenic group with the reaction product of an ethylenic-alpha-beta dicarboxylic acid and a glycol and an adherent overcoat of a transparent film forming organic resinous material comprising cellulose nitrate, an alkyd resin and a melamine aldehyde resin on the surface of the filled fabric containing an amount of abrasive agent sufficient to make said layer receptive to pencil lines.

References Cited in the file of this patent

UNITED STATES PATENTS

| | | |
|---|---|---|
| 2,218,474 | Moore | Oct. 15, 1940 |
| 2,409,633 | Kropa | Oct. 22, 1946 |
| 2,451,126 | Springfield | Oct. 12, 1948 |
| 2,513,268 | Steinman | June 27, 1950 |

FOREIGN PATENTS

| | | |
|---|---|---|
| 483,011 | Great Britain | Apr. 8, 1938 |
| 588,025 | Great Britain | May 12, 1947 |